Patented Sept. 9, 1924.

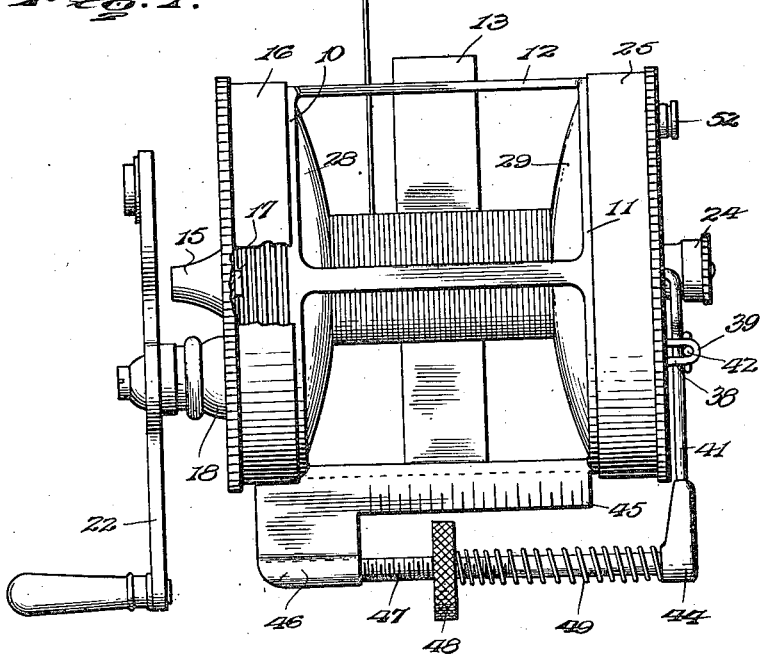
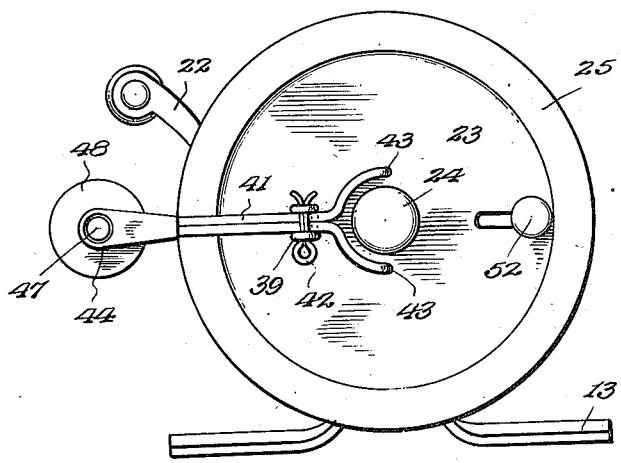

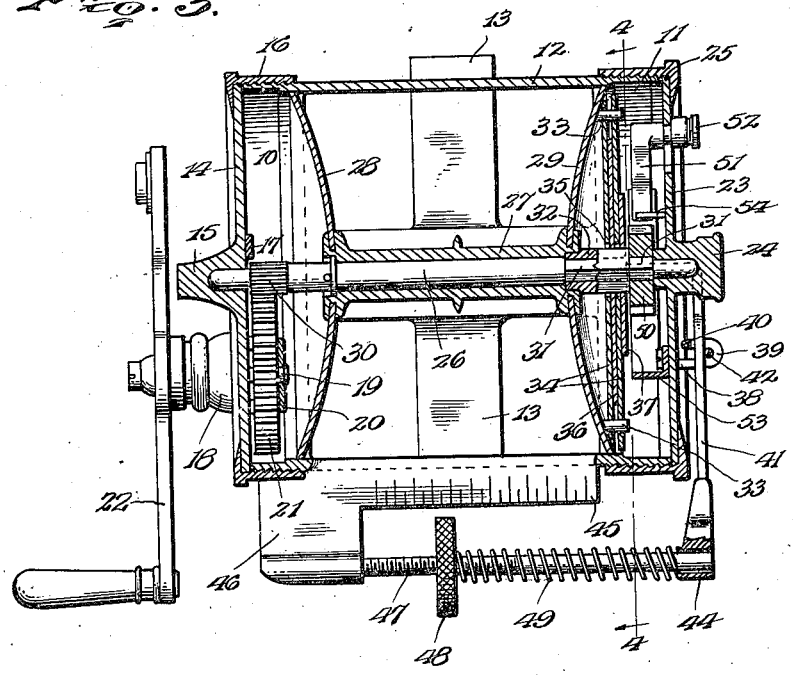
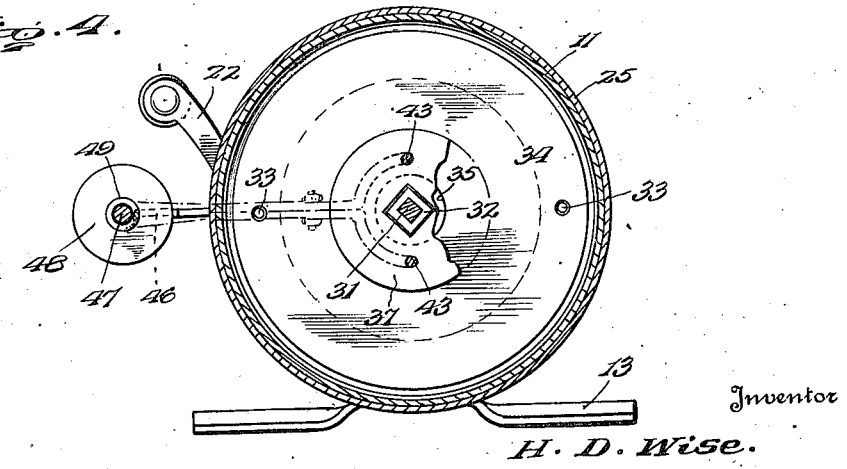

1,508,080

UNITED STATES PATENT OFFICE.

HURON D. WISE, OF HUNTLEY, MINNESOTA.

FISHING REEL.

Application filed August 16, 1923. Serial No. 657,794.

*To all whom it may concern:*

Be it known that I, HURON D. WISE, citizen of the United States, residing at Huntley, in the county of Faribault and State of Minnesota, have invented certain new and useful Improvements in Fishing Reels, of which the following is a specification.

This invention relates to an improved fishing reel and seeks, as one of its principal objects, to provide a device of this character wherein the spool may rotate independently of the hand crank therefor so that even though the crank is being turned to wind the line upon the spool, the spool will be permitted to counter-rotate under the pull of a fish upon the line to thereby prevent breaking of the line.

The invention seeks as a further object, to provide a reel wherein the spool will be driven from the hand crank through the medium of a clutch adapted to permit independent rotation of the spool and wherein means will be provided for frictionally tightening the clutch to control such independent rotation.

And the invention seeks, as a still further object, to provide a reel wherein the clutch mechanism will be enclosed but wherein means will be conveniently located for adjusting the clutch.

Other and incidental objects will appear hereinafter.

In the drawings:

Figure 1 is a plan view of my improved reel,

Figure 2 is an end elevation of the device,

Figure 3 is a horizontal sectional view taken medially through the device,

Figure 4 is a vertical sectional view on the line 4—4 of Figure 3, looking in the direction of the arrows.

In carrying the invention into effect, I employ a reel frame embodying end rings 10 and 11 connected by spacers 12 and formed on one of said spacers are lugs 13 for connecting the reel with a rod. Fitting the ring 10 is an end plate 14 carrying an axial bearing 15 and threaded upon said ring is a collar 16 clamping the end plate in position, the plate being locked against rotation by a cross rod 17 engaging at its ends in suitable notches in the ring 10. Projecting from the plate 14 below the bearing 15 is a bearing 18 through which is journaled a drive shaft 19 supported at its inner end by a plate 20 at the inner side of the end plate 14, and fixed to said shaft between the plates 14 and 20 is a drive gear 21. Secured upon the shaft at its outer end is a hand crank 22. Fitting the ring 11 is an end plate 23 carrying an axial bearing 24 and threaded upon said ring is a collar 25 clamping said plate in position.

Journaled at its ends in the bearings 15 and 24 of the end plates 14 and 23 of the reel frame is a spindle 26 and rotatably mounted upon said spindle is a spool including a hub 27 receiving the spindle therethrough. Mounted on the ends of said hub are oppositely presented concavo convex end plates 28 and 29 received within the end rings 10 and 11 of the frame. Adjacent one end, the spindle carries a pinion 30 meshing with the drive gear 21 so that, as will be seen, the crank 22 may be turned for rotating the spindle and formed on the spindle adjacent its opposite end is a squared portion 31. Removably fitting the squared portion 31 is a squared collar 32.

As will be observed, the end plate 29 of the spool cooperates with the end ring 11 and end plate 23 of the frame to form a housing and enclosed within said housing is the clutch mechanism employed as well as the click of the reel. Projecting from the end plate 29 parallel to the spindle are diametrically arranged posts 33 and apertured to fit over said posts are clutch discs 34 provided with central openings 35 freely receiving the collar 32 of the spindle therethrough so that said discs may turn with the spool independently of the spindle. Interposed between the clutch discs 34 is a clutch disc 36 somewhat smaller in diameter than the discs 34 and resting against the outermost of the discs 34 is a still smaller clutch disc 37. The discs 36 and 37 are apertured centrally to fit the collar 32 of the spindle so that these discs will be driven by the spindle. Mounted at its ends upon the end plate 23 of the reel frame in the rear of the bearing 24 is a bracket 38 bent over to form alined loops 39 at the outer extremity of the bracket as well as defining an intermediate loop 40 between the legs of the bracket and resting in the latter loop is a lever 41 held by a cotter pin or other suitable fastening device 42 extending through the loops 39 over the lever, the element 39 forming a fulcrum for the lever. At its forward end the lever is forked to straddle the bearing 24 and is provided with spaced laterally directed fingers 43 extending freely through the end plate 23 to bear against the clutch disc 37 and secured to or otherwise mounted on the lever at its rear end is a sleeve 44. Formed on the adjacent spacer of the reel frame at the rear side of the frame is a horizontally disposed plate 45 terminating at one end in a laterally directed bracket 46 and fixed at one end to said bracket is a rod 47 freely received at its opposite end in the sleeve 44 of the lever 41. Threaded upon said rod is a nut 48 and bearing between said nut and the sleeve is a spring 49 tending to rock the lever and bind the clutch discs 34, 36 and 37 together. Thus, as will be seen, said disc will form a driving connection between the spindle 26 and the reel spool so that when the crank 22 is turned for rotating the spindle, the spool will be rotated therewith. However, should a fish pull sufficiently hard upon the line wound upon the reel, the discs 36 and 37 will slip upon the discs 34 so that the spool will counter-rotate independently of the spindle. Accordingly, even though the crank 22 is being turned to wind the line in, the spool may, nevertheless, be counter-rotated independently of said crank by the pull of the fish upon the line and breaking of the line thereby obviated. The nut 48 provides, of course, a means for tightening the clutch and thus controlling the independent rotation of the reel. As will be seen, this nut may be adjusted along the rod 47 for tensioning the spring 49 against the lever 41 and thus increasing the pressure of the fingers 43 of the lever against the clutch disc 37 and, preferably, the plate 45 will carry suitable calibrations for indicating the adjustment of the clutch.

Removably fitting the squared portion 31 of the spindle 26 to abut the collar 32 is a ratchet wheel 50 and slidably mounted upon the end plate 23 of the reel frame is a pawl 51 to cooperate with said wheel. The pawl is provided with a shank projecting freely through a suitable slot in the plate and mounted on said shank is a button 52 at the outer side of the plate, which button may be grasped for shifting the pawl radially inward to engage the wheel, or, as shown in Figure 3, retracting the pawl. Screwed or otherwise secured to the end plate at its inner side is a split annular spring 53, the ends of which engage the pawl at opposite sides thereof so that the spring will function to yieldably hold the pawl against the ratchet wheel and projecting inwardly from said plate adjacent the free end of the pawl is a stop post 54 for limiting the pawl against pivotal movement in one direction so that when the pawl is shifted to engage the ratchet wheel, the pawl will function to lock the spindle against counter-rotation. Accordingly, backward spinning of the spool may be prevented so that when trolling or casting, the drag of the clutch against the line will serve to hook a fish striking the bait.

Having thus described the invention, what is claimed as new is:

1. A fishing reel including a frame, a spindle journaled thereon, means for rotating the spindle, a spool journaled upon the spindle, a clutch forming a driving connection between the spindle and the spool whereby the spool may turn independently of the spindle, a lever mounted upon the frame to coact with the clutch for tightening the clutch, a spring pressing the lever against the clutch, and means for adjustably tensioning said spring.

2. A fishing reel including a frame, a spindle journaled thereon, a spool journaled upon the spindle, a clutch disc mounted to turn with the spool, a coacting clutch disc mounted to coact with the spindle cooperating with said first mentioned disc forming a driving connection between the spindle and spool, means for rotating the spindle, a lever pivoted upon the frame and provided with a finger bearing against the latter disc, a rod carried by the frame, a nut adjustable upon said rod, and a spring bearing between said nut and the lever acting upon the lever for pressing the latter disc into engagement with said first mentioned disc.

In testimony whereof I affix my signature.

HURON D. WISE. [L. S.]